ROBERT J. ROMAN
INVENTOR.

Nov. 25, 1969  R. J. ROMAN  3,480,226
PROJECTION CARTRIDGE

Filed Nov. 1, 1966  2 Sheets-Sheet 2

ROBERT J. ROMAN
INVENTOR.

BY Malcolm F. Dunn
Robert W. Hampton

ATTORNEYS 3,480,226
PROJECTION CARTRIDGE
Robert J. Roman, Rochester, N.Y., assignor to Eastman Kodak Company, Rochester, N.Y., a corporation of New Jersey
Filed Nov. 1, 1966, Ser. No. 591,249
Int. Cl. G03b 1/04
U.S. Cl. 242—71.1                9 Claims

ABSTRACT OF THE DISCLOSURE

A cartridge adapted to receive a flanged reel of strip material and to be latched to a projector, comprises an outer casing and an inner member. The outer casing includes a side wall and an edge wall which cooperate with a wall of the projector to define a closed chamber for the strip material when the cartridge is on the projector. The inner member fits within the outer casing and defines an inwardly facing annular surface having an internal diameter which is less than the flange diameter of the reel and beyond which the flange can be snapped when inserting the reel into the cartridge or removing it therefrom.

---

Figure 1:
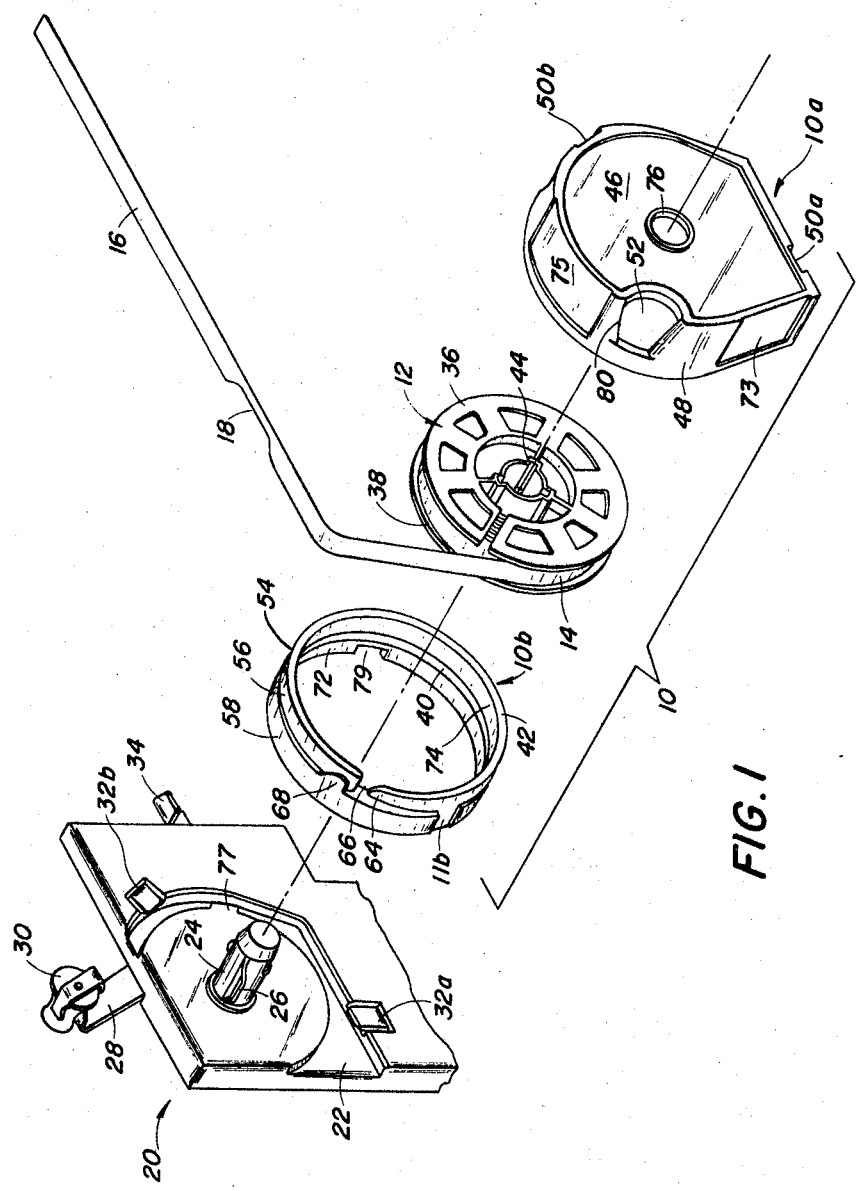

The present invention is directed to a cartridge for receiving, storing, and loosely supporting a reel of strip material, and preferably to a cartridge for projecting a reel of strip material in a motion-picture projector or for use in other apparatus employing strip material.

In my copending U.S. application Ser. No. 591,248, entitled Rim Trap for Photographic Film Projection Cartridge, filed Nov. 1, 1966, I disclose an arrangement by which the leader of the film is trapped in the outer periphery of the cartridge so that the person operating a motion-picture projector may readily prepare the projector for operation by grasping the leader through a finger opening in the periphery of the cartridge and removing the leader for insertion in the automatic threading mechanism of the projector. An object, therefore, of the present invention is to provide a cartridge that will readily receive, through an opening in a side wall of the cartridge, a reel of strip material, with the reel being readily snapped into the cartridge and operable on an apparatus from within the cartridge in the manner disclosed in the aforementioned copending application.

Another object of the invention is to provide a cartridge for receiving a reel of strip material, with the character of the strip material being identified on the cartridge and the strip material always returning to the reel in the cartridge so that the strip material is not unintentionally separated from the cartridge that carries the identification of the strip material.

Other objects of the invention will become apparent, to those skilled in the art to which this invention pertains, from the drawings and the description of the drawings that follows.

Figure 2:
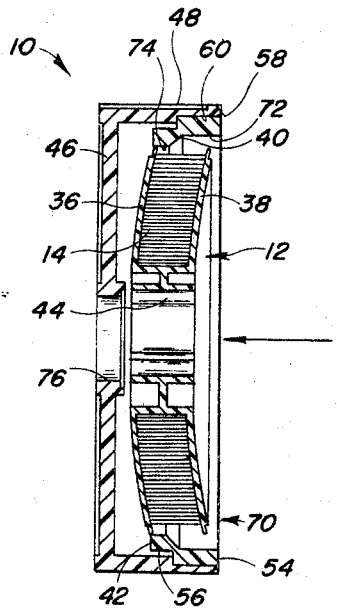
Figure 4:
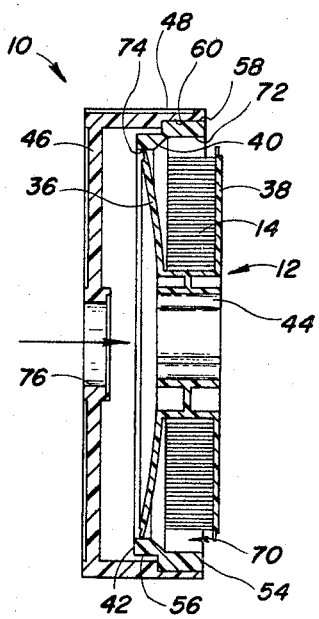
Figure 3:
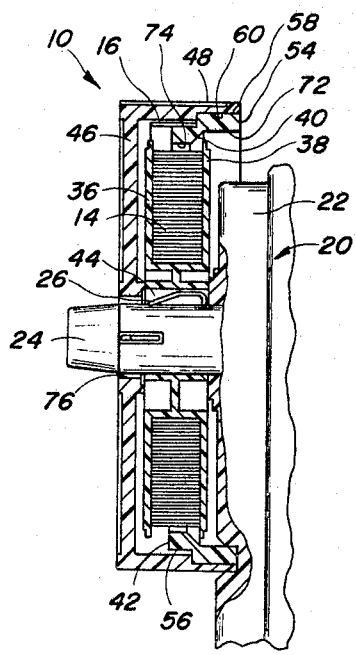
Figure 5:
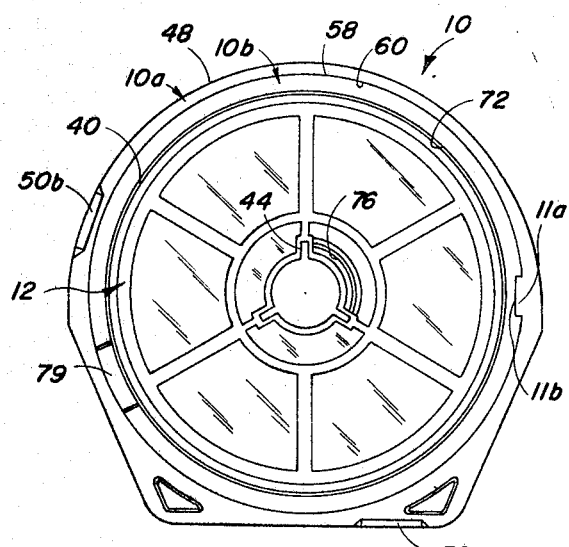

In the drawings:

In FIG. 1 is shown a perspective exploded view of the parts of the projection cartridge, of a supply reel of film, and of that portion of a film projector adapted to receive the cartridge;

In FIG. 2 is shown a cross-sectional view illustrating the reel as it is being snap-inserted into the cartridge;

In FIG. 3 is shown a cross-sectional view of the reel within the cartridge and as the cartridge is assembled on the spindle of a film projector;

In FIG. 4 is shown a view similar to that in FIG. 2 and illustrating the reel as it is being snapped out of the cartridge; and In FIG. 5 is shown in elevation a rear view of the cartridge and reel.

The projection cartridge of this invention is designed to readily receive, store, and support a supply reel of film, and the cartridge is adapted to be used on a motion-picture projector or any other apparatus that may use reels or spools of strip material without removing the reel from the cartridge.

In reference to the drawings, the projection cartridge is indicated generally at 10, and in FIG. 1 wherein a cartridge is shown in two separate parts, the parts are designated as 10a for the outer casing and 10b for the inner cartridge piece. Both the inner cartridge piece and outer casing are preferably formed from a suitable plastic, and the inner cartridge piece is designed to fit in place within, and in engagement with, an interior surface of the outer casing in proper oriented position. The outer casing may be provided with a key 11a which fits within a keyway 11b in the inner cartridge piece to facilitate the orientation of one part with respect to the other.

The reel 12 is also preferably formed from a suitable plastic and may be similar, in construction and size, to a standard 50-foot reel, for example, which is returned with film that has been developed; obviously, however, the cartridge could be made in sizes appropriate to larger or smaller reels. The film on the reel is indicated in general at 14 and has a leader 16 with a slot 18 formed in the leader a predetermined distance from the free end of the leader. The purpose of the slot 18 is fully described in my aforementioned copending application.

Only the pertinent portions of a film projector are shown since those portions not shown would be conventional; thus, that part of the projector that is shown is indicated generally at 20. The projector is provided with a recessed support plate 22 for receipt of the projection cartridge; a supply spindle 24 for rotatably supporting the reel 12 in the cartridge; a drive member (not shown) which rewinds the reel by means of the engagement of the spring member 26 on the spindle with the reel; an idler arm 28 and an idler 30 for guiding the film 14 and its leader 16; spring-biased latch devices 32a and 32b for latching the projection cartridge 10 in loaded position on the projector; and a release lever 34 which may serve not only to release the latch devices from the cartridge when the cartridge is to be removed but also to release the idler arm when the cartridge is to be loaded on the projector so that the arm will rotate to the operative position illustrated in FIG. 1, for example. The construction and operation of the spindle 24 and its spring member 26 are more fully described in copending U.S. application Ser. No. 591,315, entitled Spindle for Supporting Reels or Spools for Rotation, filed Nov. 1, 1966, in the name of Leslie J. Bunting, now abandoned and refiled Oct. 16, 1967, as continuation application Ser. No. 679,587, now Patent No. 3,417,939. The details of the spring-biased latch devices 32a, 32b, the release lever 34, the idler arm 28, and the idler 30 are more fully described in another copending U.S. application Ser. No. 591,314, entitled Automatic Latching Mechanism and Film Guide Arm for a Cartridge-Loaded Motion Picture Projector, filed Nov. 1, 1966 in the name of Leslie J. Bunting, now abandoned and refiled Nov. 7, 1967, as continuation application Ser. No. 681,295, now Patent No. 3,394,901. The specific operation of the drive member (not shown) is further described in more detail in my copending U.S. application Ser. No. 397,451, entitled Automatic Rewinding Mechanism for Film or the Like, filed Sept. 18, 1964, and which issued Jan. 24, 1967, as U.S. Patent No. 3,300,155.

The plastic reel 12 is double-flanged with the lead flange 36 being preferably more readily flexible than the trailing flange 38 so that the lead flange will be flexed in a lateral direction toward the other flange upon engagement of the lead flange with the annular belevel surface 40 of the inner cartridge piece 10b as the reel is snap-inserted in the cartridge 10, as shown in FIG. 2. The annular surface 42, which defines, in effect, part of a chamber for receipt of the reel, tends to retain the reel in the cartridge unless the reel is intentionally, forcibly removed therepast, at which time the lead flange will be flexed laterally in the opposite direction away from the other flange whenthe lead flange is urged against surface 42 as shown in FIG. 4.

The reel 12 is provided with drive slots 44, one of which is engaged by the spring member 26 on the spindle for rotatably driving the reel when the projector has been tripped into a rewind operation.

The outer casing 10a of the projection cartridge 10 is provided on one side with a side wall 46, and a peripheral wall 48 with two recessed surfaces 50a and 50b being formed in the outside surface of the peripheral and constituting latch locations for locking engagement with the chamber 50 (FIG. 5) at each recessed surface by the latching devices 32a, 32b, respectively. A finger opening 52, through which the strip material passes out of and into the cartridge, is provided in the outer peripheral edge of the outer casing 10a.

The inner cartridge piece 10b includes an annular rim 54, which forms a side wall of the cartridge, having an outer surface 56 for receiving and supporting the leader 16 (for the purpose more fully described in the aforementioned Rim Trap for Photographic Firm Projection Cartridge), and a surface 58 for frictionally engaging in assembled relation the recessed inside peripheral surface 60 of the outer cartridge casing 10a.

When the outer cartridge casing 10a and inner cartridge piece 10b are assembled, the annular rim 54 projects toward but is spaced from the side wall 46, and the outer leader support surface 56 of the rim is spaced from the peripheral wall 48 to form a rimmed area in the outer periphery of the projection cartridge 10 outwardly of the area that constitutes a chamber for receiving the reel.

The annular rim 54 is provided with an edge 64 defining one side of a slot 66 in the rim for passage of the film to and from the reel 12. A ramp 68 extends laterally from surface 58 part way over the outer surface 56 of the rim 54 at a location forward of the slot 66 for a purpose more fully described in aforementioned application Ser. No. 591,248.

Before the reel 12 is inserted in the projection cartridge 10, the leader 16 is manually extended into the cartridge and up through the slot 66 in the annular rim 54 and out through the finger opening 52 in the outer casing 10a. The reel is then moved bodily in an axial direction (as shown by the arrow in FIG. 2) into the chamber of the cartridge through the opening 70, which is defined by an inner peripheral surface 72 of the inner cartridge piece 10b, until the lead flange 36 of the reel 12 is forcibly snapped past the annular beveled surface 40 of the inner cartridge base 10b to be loosely retained in the reel-retention position by annular surface 42. The operation of snap-insertion of the reel into the projection cartridge is a modification of the reel snap-insertion construction disclosed in a copending U.S. application Ser. No. 591,-235, entitled Strip Material Storage and Feed Arrangement, filed Nov. 1, 1966, by Norman J. Rosenberg. The diameter of the surface 74 of the inner cartridge piece 10b, which surface lies between beveled surface 40 and annular surface 42, is less than that of the reel flanges 36, 38; and the combined widths of surface 74 and beveled surface 40 in an axial direction are less than the distance between the facing surfaces of the reel flanges. In this manner, the annular rim portion containing surfaces 40, 42, 74 extends partly within and between the reel flanges to loosely retain the reel in the chamber of the cartridge. The cartridge now serves to support and store the reel of film until such time that the film is to be projected, and whatever identification of the film is desired may be labeled (not shown) in either or both recessed areas 73, 75 on the outside surface of the cartridge, or the recessed area of side wall 46.

When the projection cartridge 10 is to be used, the cartridge is loaded onto the recessed support plate 22 so that the open side of the cartridge faces the support plate, and that the projector spindle 24 extends through the opening 76 formed in cartridge casing side wall 46. An additional key 77 may be provided on the recessed plate of the projector for fitting within a keyway 79 provided on the inner cartridge piece 10b so as to further ensure the proper orientation of the cartridge to the projector, as shown in FIG. 1. The spring-biased latch devices 32a, 32b are engaged and depressed by the chamfers 50 on the cartridge until the latch devices slip over the chamfers into locking engagement. As the latch devices are being depressed, the idler arm 28 and its idler 30 are released from the inoperative position (not shown), and a spring arrangement (not shown) forces the idler to rotate upward into operative position. The idler arm can be manually depressed into inoperative position, and the latch devices can be released from locking engagement by depressing the release lever 34. Also, if desired, the depression of the release lever may cause release of the idler arm so that it will be free to move to operative position. The details of this operation are more fully described in the copending latching application.

In order to protect the surface of the film as the film passes into and out of the cartridge, a slight twist is imparted to the film so that only its edges will come into contact with any of the edges defining the film passageway openings. The forward edge of the finger slot 52 is curved, as shown at 80 in the drawings, and the idler arm 28 and idler 30 are slightly disposed inwardly toward the projector relative to the rim slot 66 in the cartridge, all in the manner more fully described in copending U.S. application Ser. No. 591, 153, entitled Film Guide Edges on Projection Cartridge, filed Nov. 1, 1966, by Leslie J. Bunting.

The reel is loosely supported within the projection cartridge so that, when the cartridge is in assembled position on the projector and the reel is in assembled position on the spindle, the reel will be supported out of engagement with the structure of the cartridge. In this manner the reel is free to rotate relative to the cartridge, as may be observed from FIG. 3 of the drawings. The spindle serves to accomplish the function of supporting the reel out of engagement with the cartridge.

When the reel is to be removed from the cartridge, the leader 16 is pulled from the rim trap in the outer periphery of the cartridge and the reel may be turned manually to wind the leader through the rim slot 66 onto the reel. The reel is then forced out, such as by inserting a finger through the opening 76 and pushing outwardly on the reel until the reel trailing flange 38 can be grasped to pull outwardly on the reel in the direction shown by the arrow in FIG. 4.

The invention has been described in detail with particular reference to the preferred embodiment thereof, but it will be understood that variations and modifications can be effected within the spirit and scope of the invention.

I claim:

1. A cartridge for receiving a reel of strip material and adapted to be supported by an apparatus through which the strip material is movable, said cartridge comprising:
   an outer casing having two sides and defining a side wall on one of said sides, a peripheral wall extending from said side wall toward the other of said sides, and an opening on the other of said sides, said peripheral wall having an inner surface; and
   an inner casing member adapted to be positioned within said outer casing to define with said outer casing a chamber for receiving the reel, said inner casing member having an outer surface that is received by said inner surface of said peripheral wall, said inner casing member having an inner surface defining an edge extending radially into said chamber past which a portion of the reel is adapted to be moved when the reel is received in said chamber, said edge serving to retain the reel within said chamber.

2. A cartridge as defined in claim 1, wherein said outer casing and said inner casing member have cooperating means for orienting the position of said inner casing member relative to said outer casing.

3. A cartridge as defined in claim 1, wherein said inner casing member has a keyway adapted to cooperate with a key on the apparatus to orient said cartridge relative to the apparatus when said cartridge is in operative position on the apparatus.

4. A cartridge as defined in claim 1, wherein said peripheral wall of said outer casing includes an outside surface having recessed latching surfaces adapted to cooperate with latching devices on the apparatus when said cartridge is in operative position on the apparatus to hold said cartridge to the apparatus.

5. A cartridge as defined in claim 1, wherein said outside surface of said peripheral wall has recess means adapted to receive identification for the reel of strip material that is to be received in said cartridge.

6. A cartridge as defined in claim 1, and wherein said peripheral wall and said side wall define a passageway through which the strip material is adapted to pass from and to the reel within said chamber.

7. A cartridge as defined in claim 1, wherein the reel to be received within said chamber comprises a flange having a peripheral portion adapted to be moved past said edge, and wherein said edge extends radially inwardly beyond the peripheral portion of the flange when the reel is received in said chamber, said edge further comprising a beveled surface adapted to be engaged by the peripheral portion of the flange to axially deflect the flange when the reel is received in said chamber, thereby permitting axial receipt of the reel in said chamber and movement of the flange past said edge.

8. A cartridge as defined in claim 1, wherein the reel to be received in said chamber has a pair of spaced flanges one of which defines the reel portion movable past said edge, and wherein said edge extends between the reel flanges when the reel is within said chamber to rotatably retain the reel in said chamber.

9. A cartridge as defined in claim 1, and wherein said inner surface of said peripheral wall defines a recess, and said outer surface of said inner casing member is adapted to be received in said recess, said inner casing member defining a keyway and said inner surface of said peripheral wall defining a key adapted to fit within said keyway to orient said inner casing member relative to said outer casing.

References Cited

UNITED STATES PATENTS

| | | | |
|---|---|---|---|
| 1,510,738 | 10/1924 | Capstaff | 242—71.1 X |
| 1,686,204 | 10/1928 | Covert | 242—71.1 |
| 3,045,800 | 7/1962 | Landgraft. | |
| 3,231,081 | 1/1966 | Elterman | 206—52 |
| 3,278,017 | 10/1966 | Kearns | 206—52 |
| 2,830,812 | 4/1958 | Nash et al. | |

STANLEY N. GILREATH, Primary Examiner

W. H. SCHROEDER, Assistant Examiner

U.S. Cl. X.R.

352—78